June 23, 1925.
G. L. ERTZ
1,543,071
METHOD AND MEANS FOR VAPORIZING FUEL IN INTERNAL COMBUSTION ENGINES
Original Filed Nov. 14, 1921
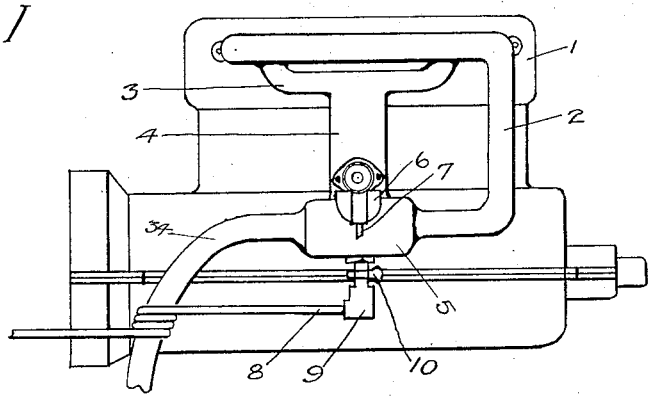
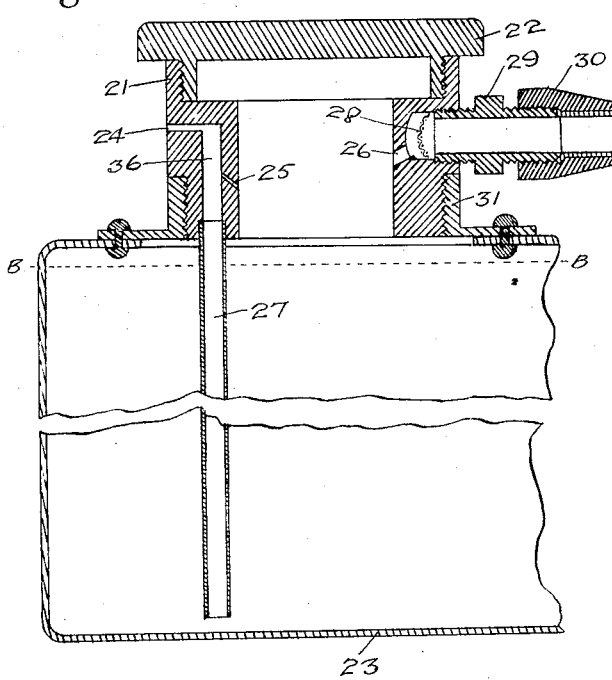
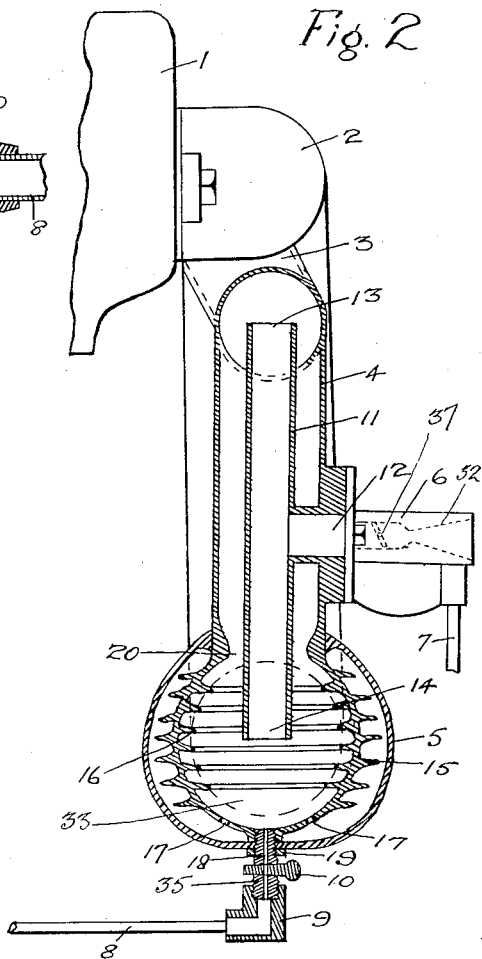
Inventor.
George L. Ertz
by Charles L. Stokes
his attorney Patented June 23, 1925.

1,543,071

UNITED STATES PATENT OFFICE.

GEORGE LAWRENCE ERTZ, OF LOS ANGELES, CALIFORNIA.

METHOD AND MEANS FOR VAPORIZING FUEL IN INTERNAL-COMBUSTION ENGINES.

Application filed November 14, 1921, Serial No. 514,994. Renewed January 12, 1925.

*To all whom it may concern:*

Be it known that I, GEORGE LAWRENCE ERTZ, a citizen of the United States, and resident of Los Angeles, in the county of Los Angeles and State of California, have invented certain new and useful Improvements in Methods and Means for Vaporizing Fuel in Internal-Combustion Engines, of which the following is a specification.

My invention relates to a method and means for vaporizing fuel in internal combustion engines, by utilizing the waste exhaust heat of an engine to vaporize the fuel which furnishes the waste exhaust heat, and in addition I use, conjointly with the waste exhaust heat, the vapors of the light fractions of the oil to assist in the vaporization of the fuel.

In my co-pending application, Serial No. 495,275, filed August 25th, 1921, I have shown and described a method of vaporizing fuels by utilizing the waste heat from the exhaust gases of an engine, which heat is applied both externally and internally to the fuel being vaporized, and in addition thereto I show a method of adding air under certain conditions. I also describe in said application a method of initially vaporizing fuels by means of an electric heater whereby the engine may be started in cold weather or before the automatic generation of engine heat.

It is an object of this invention to improve upon the method described in said application whereby the same objects may be obtained by utilizing the waste exhaust heat, and also the starting of the said engine may be facilitated without auxiliary means, such as an electric heater, solely by the vapors extracted from the fuel itself.

As stated in said former application, I have discovered that agitation of the fuel with highly heated exhaust gases is a great aid to vaporization and I have now further discovered that if the said fuel is agitated by highly heated exhaust gases in conjunction with carburetted air that not only is the vaporization more complete, but also the starting of an engine is greatly facilitated by the carburetted air.

In fact, my discovery that agitation is such a great aid to vaporization is further applied in this application, inasmuch as I obtain the vapors from the fuel for carburetting the air in the same way as I obtain vaporization for the main engine charge, that is, by agitation. Not only do I use carburetted air to assist in the agitation, but also for starting the engine, and after the engine is running this same carburetted air is likewise highly heated by the exhaust gases and mixed therewith in order to assist in the vaporization of the heavier fractions.

I also show and describe an improved manifold system to be used with my method whereby segregation and vaporization of the fuel is greatly facilitated.

With reference to the drawings in which the same numbers indicate like parts,

Fig. 1 is a side elevation of an internal combustion engine.

Fig. 2 is a part vertical section and view of the manifold.

Fig. 3 is an enlarged section showing a fuel reservoir embodying means to provide the necessary agitation for obtaining carburetted air.

1 represents a cylinder of an internal combustion engine having an exhaust manifold 2, inlet manifold 3 with a dependent enlarged portion 4 to which is attached a carburetor 6 having a fuel feed pipe 7 and a throttle 37. In the interior of 4 is a concentric pipe 11 which has an entry pipe 12 branching in an upward and downward direction with exit passages 13 and 14 leading into the upper and lower ends of 4 respectively. Passage 12 registers with the inlet passage 32 of the carburetor to receive a mixture of air and fuel therefrom.

Manifold 4 at its lower portion is expanded into a bulb 33 into which passage 14 opens.

Bulb 33 is so arranged as to have a series of exterior heat absorbing fins 15 and a series of interior heat radiating fins 16 and is adapted to be surrounded by casing 5 into one end of which the exhaust manifold 2 is fitted and from the other end of which exhaust pipe 34 leads.

5 is clamped onto 33 by a fitting 35 and is held tightly in place by locknut 19, and 33 is adapted to be surrounded by 5 in a substantially gas-tight relation. Fitting 35 has a small central hole 18 drilled therethrough which is adapted to be closed by a cock 10, and in its lower portion bulb 33 has one or more small holes 17 drilled to provide a passage from the interior of 5 to the interior of 33.

A fitting 9 is joined onto 35 to provide an entry for a pipe 8 leading to closure 21 of a fuel tank 23, and pipe 8 is coiled around exhaust pipe 34, either exteriorly or interiorly.

Tank 23 may be any fuel tank open to atmosphere having a collar 31 into which closure 21 is adapted to be threaded by one end, and the other end of 21 is made to receive a cap 22, and tank 23 is open to atmosphere solely through hole 24, and delivers fuel to 7 through a connection (not shown).

21 is of annular form and at one point is drilled and tapped to receive a fitting 29 to which pipe 8 is fastened by compression coupling 30.

Entry from pipe 8 to the interior of tank 23 is made through a drill hole 26 and between hole 26 and fitting 29 is placed a foraminous metal screen 28.

At another point, 21 is drilled by a hole 36 which is adapted to receive a tube 27 extending substantially to the bottom of tank 23. Passage 36 is open to atmosphere by hole 24 and a hole 25 leads from 36 to the interior of 21, above the surface B—B of the fuel in tank 23.

The operation is as follows:

If the engine be considered of the four cycle type, upon the rotation of the engine a charge of fuel and air will be sucked in through passage 32 of carburetor 6. Passage 32 is made preferably of smaller diameter than passage 12 and pipe 11 and consequently, upon the mixture of fuel and air entering pipe 11, its velocity will be diminished and the unvaporized positions of the fuel, striking the wall of 11 opposite 12, will be segregated and drop down into bulb 33. Some of the air will also pass down pipe 11 with the fuel and some will continue up through 13.

The same suction, which draws in the fuel and air through 32, also acts through bulb 33 to draw in a small amount of air through holes 17, which are preferably about the size of a No. 70 drill, and also acts through hole 18, pipe 8, and hole 26 and therethrough on the interior of 21.

The vacuum created on the interior of 21 draws air through hole 25, but the size of hole 25 being a great deal smaller than hole 26 or hole 18 the vacuum created by the engine, which at starting speeds and closed throttle is in the neighborhood of 20 to 22 inches of mercury, cannot be satisfied through 25 alone and therefore air is drawn further down through pipe 27 below the fuel level B—B, and the fuel being driven out of pipe 27, the air bubbles up through the body of the fuel and is thereby carburetted.

The agitation caused by high vacuum releases the vapors of light fractions in great quantity from the liquid fuel, even in very cold weather, and these vapors mixing with the air, which tends to agitate them, also mixes with the fine stream of air coming through hole 25 and passes through hole 26, pipe 8 and hole 18 to the interior of bulb 33 where the carburetted air meets with the air and fuel from the main charge of the carburetor itself, as well as the air or heated exhaust gases being sucked in through holes 17.

This carburetted air coming through tank 23 is of such richness under the high vacuum that it is sufficient to start the engine.

Not only does the agitation caused by air being bubbled through the fuel in tank 23 tend to liberate large quantities of vapor from the fuel but also the fact of its being under a high vacuum hastens that liberation very considerably, because the high vacuum lowers the boiling point of the fuel to such an extent that vaporization is materially quickened and the air is very strongly carburetted.

The engine, having been started by the carburetted charge introduced into the manifold both through pipe 8 and carburetor 6, is put on full load and in consequence, as the throttle is increasingly opened for load conditions, the vacuum will drop off and consequently the agitation through the fuel in tank 23 will diminish, thereby lessening the amount of vapors liberated, but to compensate for the loss of carburetted vapors due to the agitation in 23, the heat from the exhaust gases is absorbed by the fins 15 and transferred and radiated by the fins 16 thereby vaporizing the heavy fractions in bulb 33.

At the same time the exhaust gases themselves, which vary from 700 to 1000 degrees Fahrenheit, are being drawn, responsive to the engine's suction, through holes 17 and air, more or less carburetted now, is being drawn through pipe 8 from the interior of 21 and heated on its way to bulb 33 by reason of pipe 8 being coiled around the outside or inside of exhaust pipe 34 thereby tending to equalize its temperature with that of the exhaust gases.

The fuel which is admitted through carburetor 6 is separated from the air and dropped into bulb 33, coming in contact with the heated exhaust gases through 17, and the agitation caused thereby, together with the agitation caused by the heated carburetted air coming through hole 18, is such that the fuel is broken up and whirled around the bulb 33 thereby encountering the heated radiating fins 16. Thus there is a continual agitation and vaporization going on within 33, and the mixture of carburetted heated air, exhaust gases, and vaporized fuel, responsive to the suction, is carried up past the contracted throat 20 to mix with the air, which may also be carburetted, coming through pipe 13, and is carried thence into the engine cylinder and exploded.

The exhaust gases after the explosion pass out through exhaust manifold 2 to the interior of 5, and out through 34 to atmosphere and the cycle is continuously repeated. In case the engine should backfire, causing a flame in pipe 8, screen 28 is interposed between the end of 8 and the entry 26 to the fuel tank thereby preventing any conflagration due to backfiring. At the same time any pressure due to the backfire is relieved through hole 25 so that the pressure will not force liquid up tube 27 and drive it out of hole 24.

It is to be noted that the agitation of the fuel in tank 23 is more or less variable due to the variable conditions of vacuum which occur in a variable load engine, such as an automobile engine, and the agitation, and release of vapors thereby, will be greatest at the time when the greatest amount of vapors (as distinguished from liquid fuel) can be better used in the explosive mixture.

This time will be principally at starting or idling speeds, when the throttle is nearly closed and the highest vacuum prevails in the manifold, the vacuum decreasing with increase of load to a point where, in some engines, at wide open throttle and slow piston speed the vacuum in the manifold will drop off to about one-eighth of an inch of mercury (about two inches of gasoline).

At this vacuum it will be seen there will be no agitation of the fuel in tank 23, the vacuum not being sufficient to overcome the head of liquid in pipe 27, and therefore there will be but a slight flow of air (responsive to the vacuum) through hole 25 and pipe 8.

Any vacuum created in tank 23 is such that it will be satisfied or broken practically completely by air coming in through hole 25 and pipe 27, so that there will always be substantially atmospheric pressure in tank 23 whereby fuel may be drawn therefrom by any apparatus to feed the carburetor, such as a pump.

A further duty is performed by pipe 8 in addition to that already described, which is in the case where the fuel tank 23 is below the level of bulb 33 as shown.

It often occurs that an internal combustion engine is run at high speed and the ignition shut off, when the engine by the momentum of the flywheel continues to revolve for some time and draws in a considerable quantity of fuel through the carburetor, which is not exploded in the cylinder.

Inasmuch as bulb 33 cools off very rapidly without the application of heated exhaust gases, this fuel is segregated and collects in bulb 33, being held in there by the air, drawn (responsive to suction) through holes 17 and 18.

As soon as the engine comes to a complete stop, this fuel, which generally consists of a very small amount of liquid, runs back through hole 18 and pipe 8 to tank 23.

In this manner bulb 33 is cleared of any drip or condensed fuel automatically previous to starting the engine again, and at the same time the admission of carburetted air can be controlled by cock 10, which may have a dash control if desired, so that, for instance, in very hot weather when sufficient heat for starting is normally obtainable from the atmosphere cock 10 may be closed entirely, or in another instance cock 10 may be closed as when the engine and manifold are very hot by reason of the engine working under a heavy load.

I claim:

1. The method of forming a vaporous mixture for an internal combustion engine which consists in mixing liquid fuel with air, segregating unvaporized portions of the fuel, vaporizing said portions by passing therethrough a heated gas and carburetted air and then mixing the vaporized portions again with said first mentioned air.

2. The method of forming a vaporous mixture for an internal combustion engine which consists in mixing liquid fuel with air, segregating unvaporized portions of the fuel, vaporizing said portions by passing therethrough heated gas and heated carburetted air and then mixing the vaporized portions again with said first mentioned air.

3. The method of forming a vaporous mixture for an internal combustion engine which consists in agitating liquid fuel with air thereby carburetting the air, conveying the liquid fuel to a carburetor and mixing with further air, segregating the unvaporized portions of the fuel from said second mentioned air, vaporizing said portions by passing therethrough a heated gas and said first mentioned air and then mixing the vaporized portions again with second mentioned air.

4. The method of forming a vaporous combustion mixture for an internal combustion engine of the suction type which consists in drawing air from a liquid fuel supply tank, feeding liquid fuel from the tank to the engine through a series of pipes and mixing therewith further air, segregating unvaporized portions of the liquid fuel at a pre-determined position in said pipes after mixture of the same with air, vaporizing said portions by passing therethrough a heated gas and said first mentioned air and then mixing the vaporized portions with said second mentioned air, all of the steps enumerated being governed by the suction of the engine.

5. An internal combustion engine having an inlet manifold and a carburetor, in combination with a liquid fuel tank, means to feed fuel from the tank to the carburetor where it is mixed with air and passed into the manifold, means to segregate unvaporized portions of the fuel in the manifold, and means to introduce air from said tank into said segregating means.

6. An internal combustion engine having an inlet manifold and a carburetor, in combination with a liquid fuel tank, means to feed fuel from the tank to the carburetor where it is mixed with air and passed into the manifold, means to segregate unvaporized portions of the fuel in the manifold, means to introduce air from said tank into said segregating means, and means to heat said last mentioned air exterior of the manifold.

7. An internal combustion engine having an inlet manifold and a carburetor, in combination with a liquid fuel tank, means to feed fuel from the tank to the carburetor where it is mixed with air and passed into the manifold, means to segregate unvaporized portions of the fuel in the manifold, and means to introduce air through the fuel in the tank into said segregating means.

8. An engine cylinder having an inlet manifold, an exhaust pipe, and a carburetor attached thereto, in combination with means to pass a mixture of air and liquid fuel from the carburetor through the manifold to the cylinder whereby unvaporized portions of the fuel are segregated, means to introduce heated gases from the exhaust pipe into said segregating means, and means to introduce carburetted air into said segregating means.

9. An engine cylinder having an inlet manifold, an exhaust pipe and a carburetor attached thereto, in combination with means to pass a mixture of air and liquid fuel from the carburetor through the manifold to the cylinder whereby unvaporized portions of the fuel are segregated, means to introduce heated gases from the exhaust pipe into said segregating means, means to introduce heated carburetted air into said segregating means, and means to heat said carburetted air.

Signed at Rochester, in the county of Monroe, and State of New York, this 1st day of November A. D. 1921.

GEORGE LAWRENCE ERTZ.